(12) United States Patent
Shahraray et al.

(10) Patent No.: US 8,988,513 B2
(45) Date of Patent: *Mar. 24, 2015

(54) METHOD AND SYSTEM FOR TIME-MULTIPLEXED SHARED DISPLAY

(71) Applicant: AT&T Intellectual Property I, L.P., Atlanta, GA (US)

(72) Inventors: Behzad Shahraray, Holmdel, NJ (US); David C. Gibbon, Lincroft, NJ (US); Zhu Liu, Marlboro, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 161 days.

This patent is subject to a terminal disclaimer.

(21) Appl. No.: 13/868,685

(22) Filed: Apr. 23, 2013

(65) Prior Publication Data

US 2013/0235172 A1    Sep. 12, 2013

Related U.S. Application Data

(63) Continuation of application No. 12/579,937, filed on Oct. 15, 2009, now Pat. No. 8,446,462.

(51) Int. Cl.
| | |
|---|---|
| *H04N 13/02* | (2006.01) |
| *H04N 3/02* | (2006.01) |
| *G02B 27/22* | (2006.01) |
| *G09G 3/00* | (2006.01) |
| *G09G 5/397* | (2006.01) |

(52) U.S. Cl.
CPC .............. *H04N 3/02* (2013.01); *G02B 27/2264* (2013.01); *G09G 3/003* (2013.01); *G09G 5/397* (2013.01); *G09G 2358/00* (2013.01)

USPC .......................................................... 348/55

(58) Field of Classification Search
USPC .................. 348/42–60; 380/54, 210; 345/629
See application file for complete search history.

(56) References Cited

U.S. PATENT DOCUMENTS

| | | | |
|---|---|---|---|
| 5,821,989 | A | 10/1998 | Lazzaro et al. |
| 5,963,371 | A | 10/1999 | Needham et al. |
| 6,529,209 | B1 | 3/2003 | Dunn et al. |

(Continued)

FOREIGN PATENT DOCUMENTS

JP        64032332        2/1989

OTHER PUBLICATIONS

M. Dogruel; "A Method for Concealment of Displayed Data"; Displays; vol. 24; Oct. 2003; pp. 97-102.*

*Primary Examiner* — Brendan Higa
(74) *Attorney, Agent, or Firm* — Wolff & Samson, PC

(57) ABSTRACT

A method is provided for sharing a display. The method includes displaying periodically a first image sequence on the display in synchronicity with a first signal, and displaying periodically a second image sequence on the display in synchronicity with a second signal. The method also includes selecting by a user the first image sequence for viewing, and shuttering periodically a set of goggles for the user in synchronicity with the first signal. A method is provided for sharing a display. The method includes displaying periodically a private image sequence on the display in synchronicity with a first signal, and displaying periodically a non-private image sequence on the display. In the method, the private image sequence and the non-private image sequence combine to form a public image sequence on the display. A system is provided for sharing a display.

14 Claims, 6 Drawing Sheets

(56) References Cited

U.S. PATENT DOCUMENTS

| | | |
|---|---|---|
| 6,959,389 B1 | 10/2005 | Dunn et al. |
| 6,980,177 B2 | 12/2005 | Struyk |
| 7,191,338 B2 | 3/2007 | Stern et al. |
| 7,319,755 B2 | 1/2008 | Struyk |
| 7,965,268 B2 * | 6/2011 | Gass et al. .................. 345/87 |
| 2003/0118183 A1 | 6/2003 | Struyk |
| 2006/0041758 A1 | 2/2006 | Dunn et al. |
| 2006/0126156 A1 | 6/2006 | Evans et al. |
| 2006/0221067 A1 * | 10/2006 | Kim et al. ................... 345/204 |
| 2007/0040780 A1 * | 2/2007 | Gass et al. .................. 345/87 |
| 2008/0144967 A1 | 6/2008 | Struyk |
| 2009/0244364 A1 | 10/2009 | Nonogaki |
| 2010/0026794 A1 | 2/2010 | Chang |
| 2010/0079585 A1 | 4/2010 | Nemeth et al. |
| 2010/0177112 A1 * | 7/2010 | Miyasaka et al. ............ 345/589 |
| 2012/0047023 A1 | 2/2012 | Kruglick |

* cited by examiner

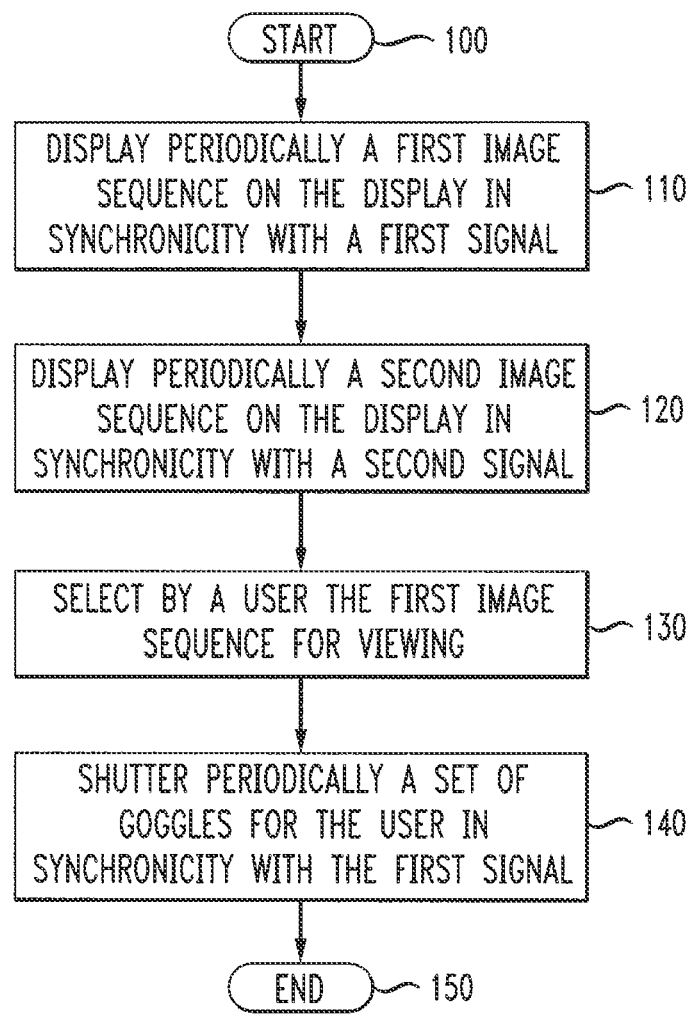

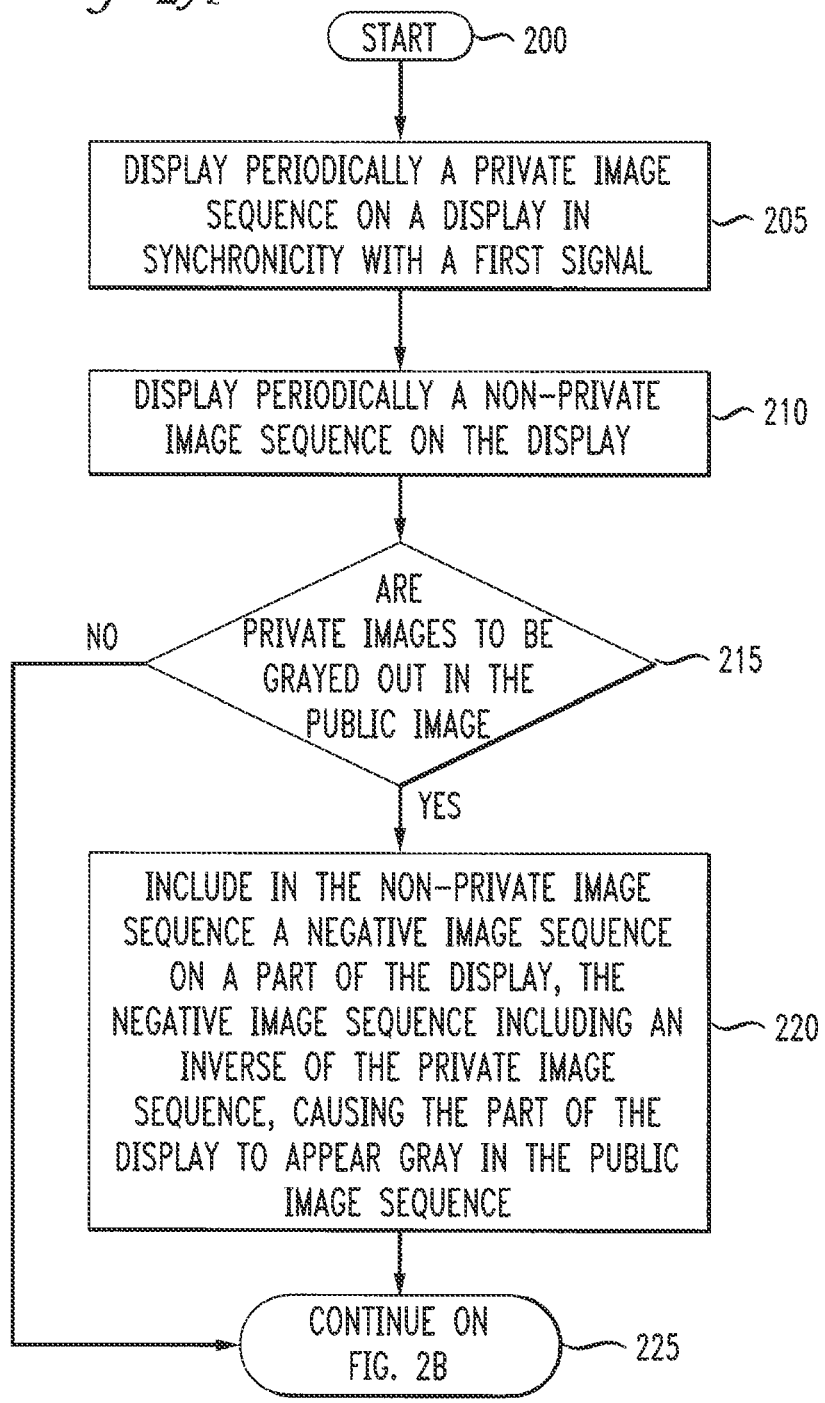

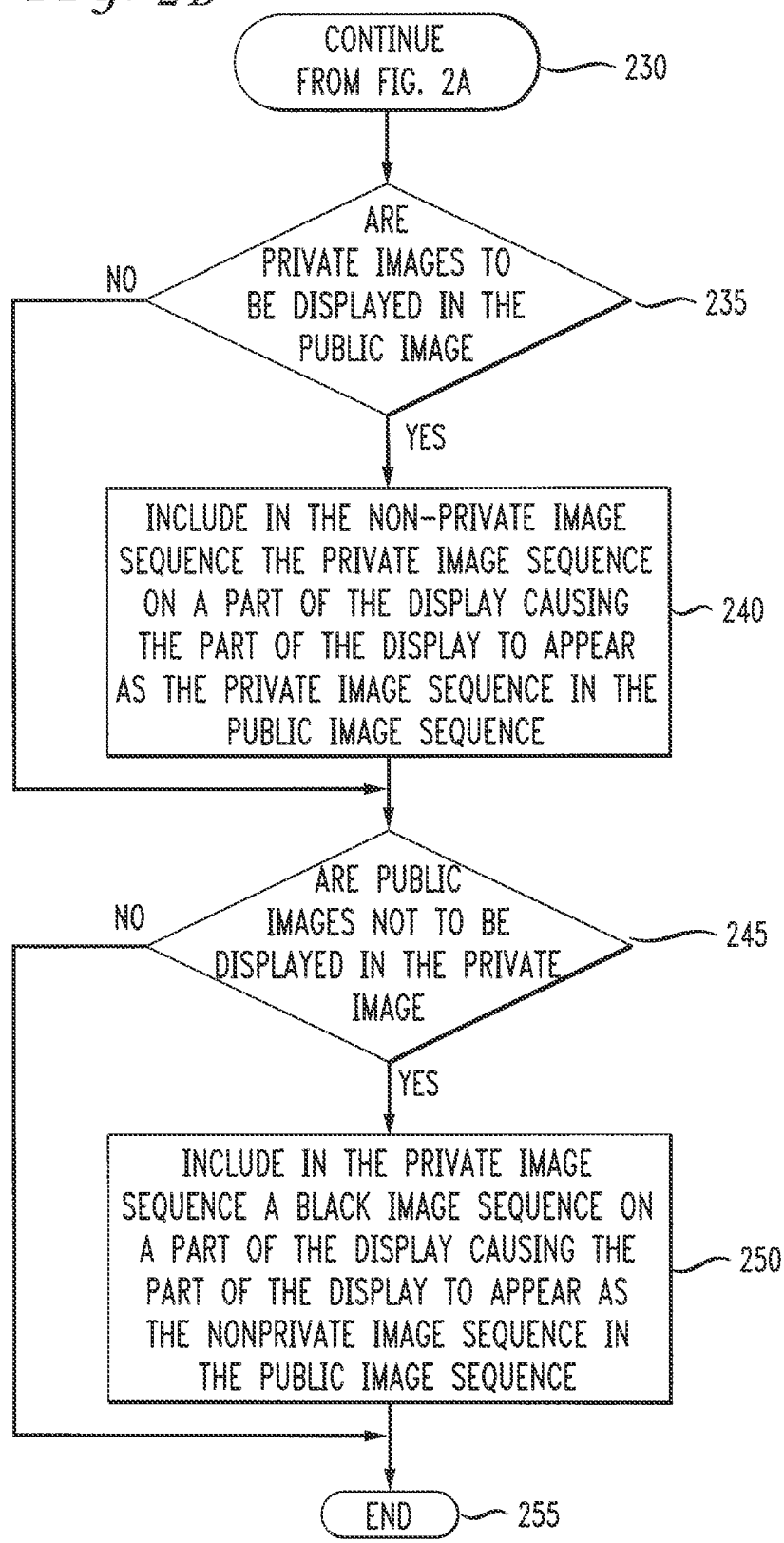

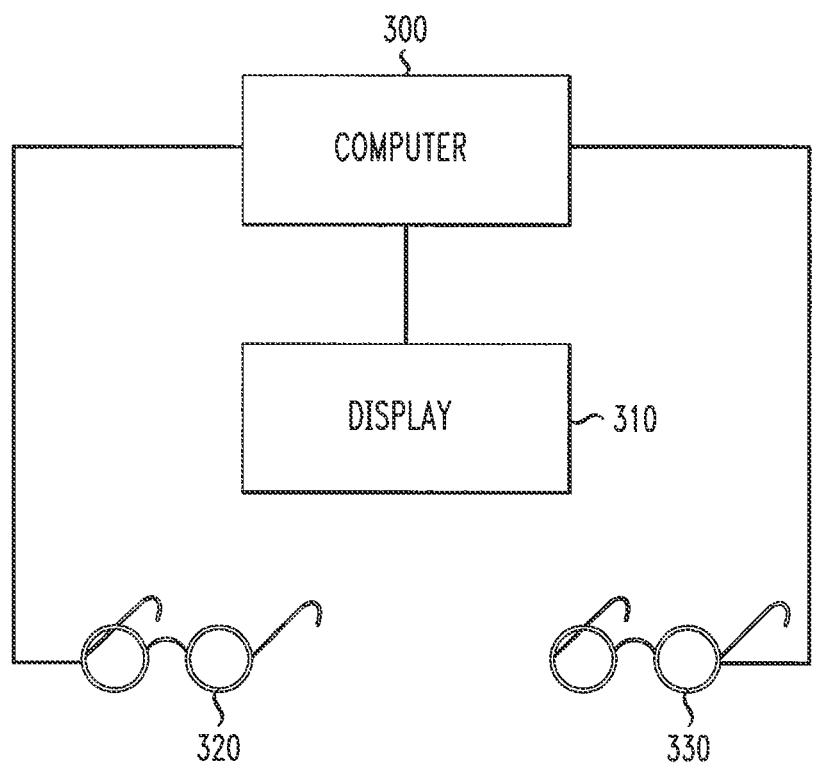

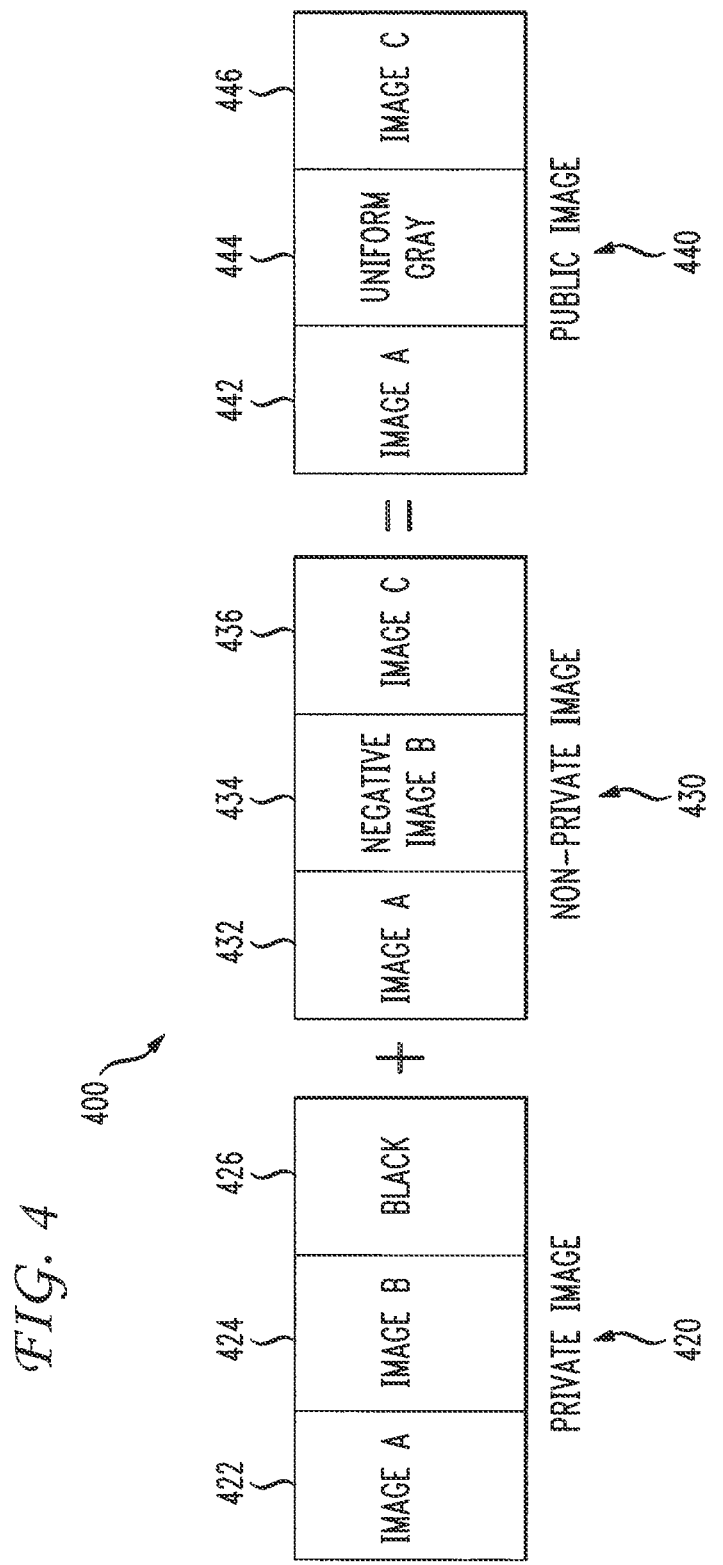

METHOD AND SYSTEM FOR TIME-MULTIPLEXED SHARED DISPLAY

This application is a continuation of U.S. patent application Ser. No. 12/579,937, filed Oct. 15, 2009, which is hereby incorporated by reference in its entirety.

BACKGROUND

The present disclosure relates to a method and system for two or more users to view a single display having different images, or parts of images, dedicated to different users.

Televisions and computer monitors, including CRT screens, plasma screens and LCD screens, have been used to view still and/or moving images. TV's, CRT monitors, LCD screens, OLED screens, etc. (collectively referred to as displays) operate using various technologies. These technologies include scanning using cathode rays and pixels.

Film is also used to display moving images. Traditional film technology utilizes a shutter for the purpose of creating the illusion of a moving image utilizing a series of images. The shutter in a traditional film system provides a blank or black image between images of the film. The human eye perceives the series of film images and black images as a continuous moving image so long as at least 12 images per second are perceived. However, most film systems utilize at least 24 frames per second or more.

LCD screens have increasingly high refresh rates which now exceed 120 Hertz, and now may exceed 240 Hertz.

Three-dimensional (3D) films have been developed using various technologies. Some 3D film systems utilize glasses having different polarizations for each of the right and left eye lenses. Recent 3D viewing systems utilize goggles having LCD lenses (referred to herein as shuttering goggles, goggles, or LCD shuttering goggles), which are programmed to alternate between transparent and opaque. The lenses of such a 3D viewing system are synchronized with the display to provide the three-dimensional experience. The display in a 3D viewing system using shuttering goggles alternately displays a right eye image and a left eye image.

The right eye image and the left eye image may be created by filming or videotaping a scene using two cameras or an integrated stereoscopic camera. The lenses of the two cameras and/or the integrated stereoscopic camera may be separated by a typical eye distance, or another appropriate distance, to provide the stereoscopic image. The left and right images may be displayed periodically and in synchronicity, so that the right eye lens of the shuttering goggles is transparent when the right lens image of the stereoscopic sequence is displayed. Likewise, the left eye goggle lens may be transparent when the left lens image of the stereoscopic sequence is displayed. At each time that the left goggle lens is transparent, the right eye goggle lens is opaque, and vice versa.

BRIEF SUMMARY

A method is provided for a user to select between two image sequences being displayed on a single display using shuttering goggles and a user interface. The user may select one of two image sequences for viewing, and/or may switch between the two image sequences. One of the image sequences may be a different viewpoint of the other image sequence. One of the image sequences may include advertising, premium content, or a censored version of the other image sequence. The system may be used on airplanes or other space-limited areas, where users can select among a list of available movies and view them on the same display as other users but the movies do not interfere with each other. The user will only see his or her selected movie and not the other movies selected by other users. The system may be used in a video game context to avow two users to use the same screen and to view different views of the game, and to switch between the different views.

A public and private viewing system is also provided that enables a user wearing shuttering goggles to view a private image. The image sequences displayed on the screen during the periods in which the private image sequence is not shown, referred to herein as the non-private image sequence, may be coordinated with the private image sequence to provide a particular image (referred to herein as the public image sequence) to the public viewer. The public image sequence may include the same content as the private image sequence, a uniform gray image or white image (resulting from the averaging of the positive and inverted images), another distorted or obscured image sequence, and/or specific content not shown to the private image sequence viewer. A display screen for viewing public and private image sequences may be partitioned into two or more regions to enable more than one of these options to be selected at any one time.

A method is provided for sharing a display. The method includes displaying periodically a first image sequence on the display in synchronicity with a first signal, and displaying periodically a second image sequence on the display in synchronicity with a second signal. The method also includes selecting by a user the first image sequence for viewing, and shuttering periodically a set of goggles for the user in synchronicity with the first signal.

Another method is provided for sharing a display. The method includes displaying periodically a private image sequence on the display in synchronicity with a first signal, and displaying periodically a non-private image sequence on the display. In the method, the private image sequence and the non-private image sequence combine to form a public image sequence on the display. The non-private image sequence may be an inversion of the private image, in which the inversion of the private image and the private image combine to prevent the private image from being visible to the public users not using the goggle.

A system is provided for sharing a display. The system includes means for displaying periodically a first image sequence on the display in synchronicity with a first signal, and means for displaying periodically a second image sequence on the display in synchronicity with a second signal. The system also includes means for selecting by a user the first image sequence for viewing, and means for shuttering periodically a set of goggles for the user in synchronicity with the first signal.

Another system is provided for sharing a display. The system includes means for displaying periodically a private image sequence on the display in synchronicity with a first signal, and means for displaying periodically a non-private image sequence on the display. In the system, the private image sequence and the non-private image sequence combine to form a public image sequence on the display.

These and other advantages will be apparent to those of ordinary skill in the art by reference to the following detailed description and the accompanying drawings.

BRIEF DESCRIPTION OF THE DRAWINGS

FIG. 1 illustrates a method according to a first exemplary embodiment.

FIGS. 2a and 2b illustrate a method according to a second exemplary embodiment.

FIG. 3 illustrates a system according to an exemplary embodiment.

FIG. 4 schematically illustrates image combinations according to an exemplary embodiment.

DETAILED DESCRIPTION

Figure 5:
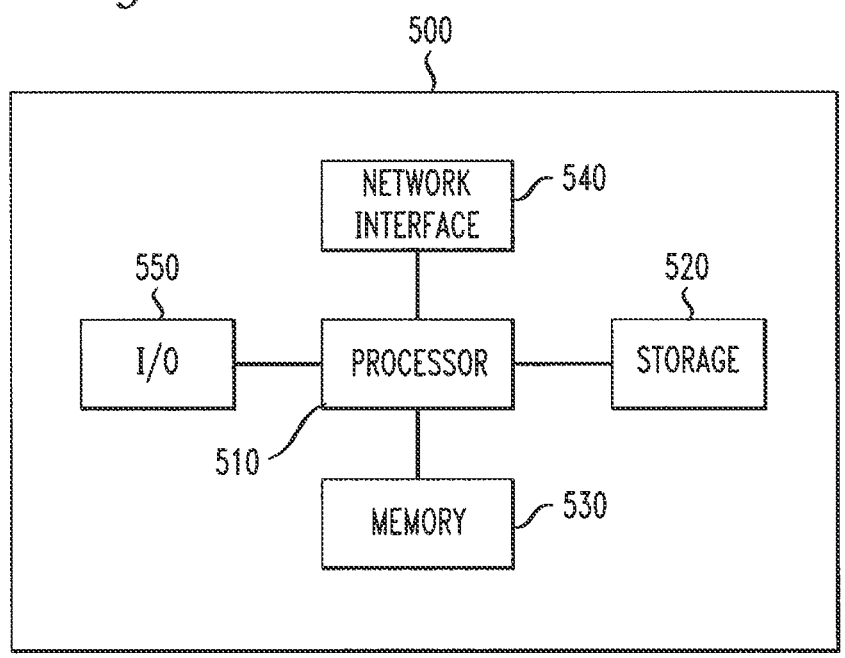
FIG. 5 illustrates a computer system according to an exemplary embodiment.

A method and system is provided for users to view different images on a single display. In one exemplary method, a display may cycle between two or more images. The two or more images may be of distinct scenes or movies, may be different viewpoints of a same scene, or may be censored or overwritten versions of the same scene. The two or more scenes may alternate at a frequency exceeding 12 frames per second per scene, and may cycle at a rate exceeding 24 frames per second per scene. As used herein, image may refer to a single image in a sequence of images, or to the series of images in a sequence.

The cycling of the different scenes of the display may be coordinated with one or more pairs of goggles. The goggles may be LCD shuttered goggles of the type used for conventional 3D viewing, with the distinction that the lenses may be coordinated with each other. For instance, goggle A may have a right and left lens which are opaque at the same time and transparent at the same time, and similar functionality may be used for goggle B. The lenses of goggle K may be transparent when an image X is displayed on the screen, and opaque when an image Y is displayed on the screen. The lenses of goggle L may be transparent when an image Y is displayed on the screen, and opaque when an image X is displayed on the screen.

In this manner, a person wearing goggle K may view a series of images from image A and thereby view the sequence of images for image X. Likewise, goggle L may have lenses coordinated to be opaque when image X is displayed and transparent when image Y is displayed. In this manner, goggle L may enable a user to view the sequence of images Y.

Additional goggles may be provided to allow multiple users to watch image X or image Y. Likewise, more goggles may be coordinated with additional images if the refresh rate and the cycling of the display is able to handle the additional images. For instance, a third image Z may be cycled with images X and Y, and a third goggle M may be provided that is coordinated with the displaying of image Z.

Additionally, goggles K and L may also be traditional 3D goggles in that the individual lenses may cycle alternately allowing the user to view stereoscopically related images of a single image. In this manner, a person wearing goggle K may have alternating views of stereoscopic image X and a person wearing goggle L may have alternating views of stereoscopic image Y. Additionally a user's goggles can be controlled to view two or more of the images X, Y, Z, to create a superposition of the images or the combination of different regions from different image sequences.

A user of goggle K may select an image to view, and therefore may toggle between image X and image Y. The toggling may be performed by selecting a switch on the goggles or on a remote, or on any other appropriate device including a computer or display mounted switch. The goggles may be synchronized with the display by a wired or wireless connection. The synchronizing of the display and the goggles may be performed by a computer, and the computer may be integrated or separate from the display.

A sound system may be provided that allows a user to hear only the audio portion of the image sequence being viewed. The sound system may include headphones coordinated with the user selection, or may include directional speakers that function to enable a user in a specific position in the viewing area to hear the audio portion of the image sequence they have selected.

A method and system is provided that enables a private viewer and a public viewer to view different images. The private and public viewing of a single display uses a partitioned display. The partitioning of a display may be in two or more regions or parts, and may be a side-by-side partitioning, or any other appropriate partitioning. In particular, one of the partitions may be a bar on the bottom of a screen, a "U" bar, an inset picture, a side-by-side partition, and/or multiple partitions. Partitioning of a display may be performed to dedicate any one or more of the designated partitions to the public viewer or the private viewer.

A private viewer of the display may use the LCD shuttered goggles described above. In particular, the private viewer may use a set of shuttered goggles, which are synchronized with each other to provide a traditional image, or may be synchronized alternately to enable each of the right eye lens and the left eye lens to display a different image to enable a stereoscopic or 3D image.

The public image of the display may be the combination of a private image and a non-private image. Since the viewer of the public image sees all of the cycled images, the public image is a sum of the private image and the non-private image. Therefore, a public image X may be identical to a private image X when a non-private image X is also identical to private image X. Additionally, a public image X may be identical to a private image X when a non-private image X is black. The public image may also be a uniform gray, uniform white, or another incoherent image by the use of a negative of the private image in the non-private image. For instance, if the private image is image Y, the non-private image may be a negative, or inverse, of image Y. The inverse of image Y may take into account a number of cycles of the image Y in the private image, and an intensity of image Y in the private image.

Image Y in the private image may require an increased intensity to enable a viewer of the private image to perceive a normally intense image despite the fact that only a certain fraction of images are displayed. Additionally, the non-private image may be displayed for a greater number of cycles than the private image, and therefore may not need to be displayed at the same intensity as image Y.

The negative of image Y may differ considerably in the black and white context. In particular, image Y may be a pure inverse of image Y substituting black for white, white for black, and gray of a particular scale for another gray of the opposite scale. The result of such a combination would be a uniform gray image.

In the context of a color private image, the negative of the color private image may be calculated by taking each of the red, green and blue (RGB) components of the private image, and subtracting them from a maximum RGB component for the display. The resulting subtracted amount may provide the RGB components for the negative of the private image. In this manner, the public image may also be a uniform gray or uniform white in the color display situation.

An image may be provided only to the public by providing a black image in the private image. This purely public image Z may be displayed as non-private image Z to enable the image Z to be viewed by the public only. Since the private viewer's LCD shuttered glasses are shuttered opaque at the time that the image Z is displayed in the non-private image, the private viewer would not see image Z.

FIG. 1 illustrates a method according to an exemplary embodiment. The flow in FIG. 1 starts at start circle 100 and proceeds to operation 110, which indicates to display periodically a first image sequence of the display in synchronicity with a first signal. From operation 110, the flow proceeds to operation 120, which indicates to display periodically a second image sequence of the display in synchronicity with a second signal. From operation 120, the flow proceeds to operation 130, which indicates to select by a user a first image sequence for viewing. From operation 130, the flow proceeds to operation 140, which indicates to shutter periodically a set of goggles for the user in synchronicity with the first signal. From operation 140, the flow proceeds to end circle 150.

The goggles or related system may provide a user the option of selecting between a first and second images being displayed on the screen. The shuttering goggles may be programmed to shutter periodically in synchronicity with either a first or a second signal based on the user selection. A second user may also use shuttering goggles and have the option of selecting one of two or more image sequences for viewing.

As used herein, an image may be a still image or a moving image, and may also refer to one or more of the sequences of images used to create the illusion of a moving image. When two image sequences are displayed on the display, individual images of each sequence may be alternately displayed on the screen, for varying periods, and/or with higher or lower frequencies. An image should be displayed at least 12 frames per second (fps), and preferably greater than 24 fps for each moving sequence to provide a flicker-free image. An image that is shown less frequently may need to be displayed with a higher intensity to compensate and provide the viewer with a normal intensity viewing experience.

A first image sequence and a second image sequence may represent different viewpoints of the same scene. A first image sequence may be a censored version of a second image sequence. A first image sequence may be a combination of a second image sequence and additional content.

The two image sequences available for viewing on a display may be two 3D images, which may therefore require four different image sequences to be displayed, since each 3D image sequence requires two image sequences (each corresponding to one eye). In this case, the shuttering goggles would have independent right and left eye lens shuttering, and the shuttering would be coordinated with one of the two 3D image sequences on the display. The user could toggle between the two 3D images in the same manner as selecting between two 2D images.

Another exemplary method is illustrated in FIGS. 2a and 2b. The flow of the method starts at start circle 200 and proceeds to operation 205, which indicates to display periodically a private image sequence on a display in synchronicity with a first signal. From operation 205, the flow proceeds to operation 210, which indicates to display periodically a non-private image sequence on the display. From operation 210, the flow proceeds to decision 215, which asks whether private images are to be displayed in the public image. If the response to decision 215 is negative, the flow proceeds to oval 225 leading to FIG. 2b. If the response to decision 215 is affirmative, the flow proceeds to operation 220, which indicates to include in a non-private image sequence a negative image sequence on a part display. The negative image sequence includes an inverse of the private image sequence causing the part of the display to appear white or gray in the public image sequence. From operation 220, the flow proceeds to oval 225 leading to FIG. 2b. The flow from oval 225 proceeds to oval 230 on FIG. 2b. From oval 230, the flow proceeds to decision 235, which asks whether private images are to be displayed in the public image. If the response to decision 235 is negative, the flow proceeds to decision 245, which asks whether public images are not to be displayed in the private image. If the response to decision 245 is negative, the flow proceeds to end circle 255. If the response to decision 235 is affirmative, the flow proceeds to operation 240, which indicates to include in the non-private image sequence the private image sequence on part of the display causing the part of the display to appear as the private image sequence in the public image sequence. An alternative method for providing the private image in the public image is to make the non-private image black. From operation 240, the flow proceeds to decision 245. If the response to decision 245 is affirmative, the flow proceeds to operation 250, which indicates to include in the private image sequence a black image sequence on a part of the display causing the part of the display to appear as the non-private image sequence in the public image sequence. From operation 250, the flow proceeds to end circle 255.

The method may include displaying periodically a second private image sequence on the display in synchronicity with a second signal. The negative image sequence may further include a second inverse of the second private image sequence. The two negative images may be summed and therefore shown simultaneously. In order for each negative image to compensate the corresponding positive image, assuming equal intensity, the duration that the positive and negative images are shown have to be equal. Combining two negative images raises additional duration issues. One potential issue is that the sum of two negative images at some pixels may exceed a maximum value, which may require cropping. Alternative embodiments may allow values to exceed the maximum value. The resulting image may be normalized to thereby avoid exceeding the maximum value. The lost intensity may be countered by increasing the duration.

The method discussed above relating to private and public images may also include selecting by a second user one of the private image sequence and the second private image sequence for viewing. The method may also include shuttering periodically a second set of goggles for the second user in synchronicity with the one of the first signal and the second signal corresponding to the one of the private image sequence and the second private image sequence selected.

The method discussed above relating to private and public images may also use 3D techniques to enable the private image to be displayed in 3D. The public image may also be displayed in 3D, though this would require the public viewer to use the shuttering goggles or any other appropriate mechanism for viewing only one series of images per eye.

FIG. 3 illustrates an exemplary system. Computer 300 operates a display 310, which may shutter between different images. Display 310 also may be partitioned into different regions, which may have different shuttering between different images. Computer 300 may synchronize the shuttering of the different displays on display 310 with the shuttering of goggles 320 and 330. Goggles 320 and 330 may be wirelessly connected to computer 300, or may have wires connecting to computer 300. Computer 300 may include a synchronizing clock, which provides timing information to goggles 320 and 330 to synchronize the LCD shuttering of the lenses therein with the cycling of the displays on display 310.

FIG. 4 illustrates schematically a combination of a private and a non-private image to make a public image. Image 420 may be displayed on a display in synchronicity with a signal that drives the shuttering goggles. Non-private image 430 may be displayed on the same display when private image 420 is not being displayed. Public image 440 may be the perceived result of continuous viewing of the display by a person not using shuttering goggles.

The display in private image 420 is spatially partitioned into three regions. However, the private and non-private images may alternatively be partitioned into two regions, or more than three regions. The private image and the non-private image should include the same boundaries between regions to enable the public image to be properly viewable. Private image 420 and non-private image 430 are summed to create public image 440. Image A shown in first region 422 of private image 420 may also be displayed in first region 432 of non-private image 430. This results in public image 440 showing image A in first region 442. Displaying a black screen in first region 432 of non-private image 430 may also result in public image 440 showing in region 442 the same image A shown in first region 422 of private image 420. Adding a display of image A in first region 432 of non-private image 430 may modulate the intensity of the image A in first region 442 of public image 440 for a public viewer not wearing shuttering goggles.

Image B may be shown in second region 424 of private image 420. Non-private image 430 may show a negative of image B in second region 432, causing public image 440 to show a uniform white or gray in second region 444. In this manner, private image 420 may include private material or material censored from public image 440, and the private material may therefore not be available to a viewer without shuttering goggles. In this manner, private image 420 may include premium content or purchased content, thereby creating a demand for private image 420. This premium content may drive a rental arrangement for the LCD shuttered goggles.

Private image 420 may also include a black image in third region 426 of the display. Non-private image 430 may include an image C in third region 436, thereby causing public image 440 to include image C in third region 446. The image C may be advertising or other content directed to the public, and the private image may be a premium content that is without advertising.

An encryption mechanism may also be provided for a shared viewing display. For example, if one movie is always shown on every 8th frame, it may be easy for someone to configure their goggles correctly and watch the movie, even though they may not be authorized to view this premium content. A simple encryption mechanism may be utilized to maintain control of access to the private image. In the situation in which four movies (Q, R, S, and T) are shown on the screen, instead of always showing QqRrSsTt (q, r, s, and t being negative fields for Q, R, S, and T), the display order may be permuted within each set of eight frames. For instance, the first two sets of eight frames may be: QrStRqTs; rsTqRStQ, or any other variation of this order. A set of goggles may be programmed to view any of the movies Q, R, S, or T only if synchronized with the apparently random display, and the synchronizing signal would be encrypted or otherwise private. In this manner, in order to view any of the private images, a user would have to be able to decrypt the synchronizing signal, which would require appropriate authorization. One of the images may be available without the encrypted synchronization signal, and therefore accessible to anyone with goggles able to cycle periodically. This image, referred to herein as a normally synchronized image, would only require that the particular unencrypted image appear in the same slot in the set of frames for each cycle. For instance, in the following image sets, image Q is the normally synchronized image: QqrstRST; QStRsTrq. In this manner, access to premium content may be secured by using an encrypted synchronization signal.

FIG. 5 illustrates a high-level block diagram of a computer in accordance with an embodiment. The computer 500 can perform the steps described above (e.g., with respect to FIGS. 1 and 2a-2b). Additionally, computer 500 can operate as computer 300 in FIG. 3. Computer 500 contains processor 510 which controls the operation of the computer by executing computer program instructions which define such operation, and which may be stored on a computer-readable recording medium. The computer program instructions may be stored in storage 520 (e.g., a magnetic disk, a database) and loaded into memory 530 when execution of the computer program instructions is desired. Thus, the computer operation will be defined by computer program instructions stored in memory 530 and/or storage 520 and computer 500 will be controlled by processor 510 executing the computer program instructions. Computer 500 also includes one or more network interfaces 540 for communicating with other devices, for example, other computers, servers, or websites. Network interface 540 may, for example, be a local network, a wireless network, an intranet, or the Internet. Computer 500 also includes input/output 550, which represents devices, which allow for user interaction with the computer 500 (e.g., display, keyboard, mouse, speakers, buttons, webcams, etc.). One skilled in the art will recognize that an implementation of an actual computer will contain other components as well, and that FIG. 5 is a high-level representation of some of the components of such a computer for illustrative purposes.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept.

The invention claimed is:

1. A method comprising:
    displaying a private image sequence on the display, wherein the private image sequence displays a plurality of content in a plurality of regions, wherein a particular content is displayed in a particular region of the display; and
    displaying a non-private image sequence on the display, wherein the non-private image sequence displays a negative image of the particular content in the particular region of the display;
    wherein the private image sequence and the non-private image sequence combine to form a public image sequence on the display, the public image sequence includes a uniform gray content appearing in the particular region of the display, such that the uniform gray content is viewable to a user without use of a set of shuttering goggles, and the particular content is viewable to a user using a set of shuttering goggles.

2. The method of claim 1, wherein the private image sequence and the non-private image sequence are displayed periodically.

3. The method of claim 1, further comprising:
    displaying a second private image sequence on the display, wherein the second private image sequence displays second content in a second region of the display;

wherein the non-private image sequence further displays an inverse image of the second content in the second region of the display.

4. The method of claim 3, wherein the private image sequence is displayed periodically in synchronicity with a first signal and wherein the second private image sequence is displayed periodically in synchronicity with a second signal, the method further comprising:
  receiving a selection, by a user, of one of the private image sequence and the second private image sequence for viewing; and
  shuttering periodically the set of goggles for the user in synchronicity with one of the first signal and the second signal corresponding to the one of the private image sequence and the second private image sequence selected by the user.

5. The method of claim 1, wherein:
  the private image sequence is a private moving image sequence; and
  the non-private image sequence is a public moving image sequence.

6. The method of claim 1, further comprising:
  displaying periodically a private right image sequence on the display in synchronicity with a first right signal and displaying periodically a private left image sequence on the display in synchronicity with a first left signal; and
  shuttering periodically a right eye goggle of the set of goggles in synchronicity with the first right signal and shuttering periodically a left eye goggle of the set of goggles in synchronicity with the first left signal.

7. The method of claim 6, wherein the private right image sequence and the private left image sequence combine to form a stereoscopic image sequence.

8. An apparatus comprising:
  a processor; and
  a memory to store computer program instructions, the computer program instructions when executed on the processor cause the processor to perform operations comprising:
    displaying a private image sequence on the display, wherein the private image sequence displays a plurality of content in a plurality of regions, wherein a particular content is displayed in a particular region of the display; and
    displaying a non-private image sequence on the display, wherein the non-private image sequence displays a negative image of the particular content in the particular region of the display;
  wherein the private image sequence and the non-private image sequence combine to form a public image sequence on the display, the public image sequence includes a uniform gray content appearing in the particular region of the display, such that the uniform gray content is viewable to a user without use of a set of shuttering goggles, and the particular content is viewable to a user using a set of shuttering goggles.

9. The apparatus of claim 8, wherein the private image sequence and the non-private image sequence are displayed periodically.

10. The apparatus of claim 8, the operations further comprising:
  displaying a second private image sequence on the display, wherein the second private image sequence displays second content in a second region of the display;
  wherein the non-private image sequence further displays an inverse image of the second content in the second region of the display.

11. The apparatus of claim 10, wherein the private image sequence is displayed periodically in synchronicity with a first signal and wherein the second private image sequence is displayed periodically in synchronicity with a second signal, the operations further comprising:
  receiving a selection, by a user, of one of the private image sequence and the second private image sequence for viewing; and
  shuttering periodically the set of goggles for the user in synchronicity with one of the first signal and the second signal corresponding to the one of the private image sequence and the second private image sequence selected by the user.

12. The apparatus of claim 8, wherein:
  the private image sequence is a private moving image sequence; and
  the non-private image sequence is a public moving image sequence.

13. The apparatus of claim 8, the operations further comprising:
  displaying periodically a private right image sequence on the display in synchronicity with a first right signal and displaying periodically a private left image sequence on the display in synchronicity with a first left signal; and
  shuttering periodically a right eye goggle of the set of goggles in synchronicity with the first right signal and shuttering periodically a left eye goggle of the set of goggles in synchronicity with the first left signal.

14. The apparatus of claim 13, wherein the private right image sequence and the private left image sequence combine to form a stereoscopic image sequence.

* * * * *